US012755099B2

(12) United States Patent
Zhang et al.

(10) Patent No.: US 12,755,099 B2
(45) Date of Patent: Oct. 6, 2026

(54) METHOD AND APPARATUS FOR TRAINING NAMED ENTITY RECOGNITION MODEL AND NON-TRANSITORY COMPUTER-READABLE MEDIUM

(71) Applicants: Yuming Zhang, Beijing (CN); Bin Dong, Beijing (CN); Shanshan Jiang, Beijing (CN); Yongwei Zhang, Beijing (CN)

(72) Inventors: Yuming Zhang, Beijing (CN); Bin Dong, Beijing (CN); Shanshan Jiang, Beijing (CN); Yongwei Zhang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 305 days.

(21) Appl. No.: 18/623,332

(22) Filed: Apr. 1, 2024

(65) Prior Publication Data

US 2024/0338523 A1 Oct. 10, 2024

(30) Foreign Application Priority Data

Apr. 6, 2023 (CN) ......................... 202310362781.8

(51) Int. Cl.
*G06F 40/295* (2020.01)
*G06F 40/284* (2020.01)
*G06N 20/00* (2019.01)

(52) U.S. Cl.
CPC .......... *G06F 40/295* (2020.01); *G06F 40/284* (2020.01); *G06N 20/00* (2019.01)

(58) Field of Classification Search
CPC ...... G06F 40/295; G06F 40/284; G06N 20/00
See application file for complete search history.

(56) References Cited

U.S. PATENT DOCUMENTS

| | | | | |
|---|---|---|---|---|
| 2017/0337182 | A1 | 11/2017 | Jiang et al. | |
| 2019/0251164 | A1 | 8/2019 | Ding et al. | |
| 2021/0012199 | A1 * | 1/2021 | Zhang | G06F 16/29 |
| 2022/0300711 | A1 * | 9/2022 | Elisco | G06N 3/08 |
| 2023/0153532 | A1 * | 5/2023 | He | G06N 3/08 704/8 |
| 2023/0394240 | A1 | 12/2023 | Zhang et al. | |

* cited by examiner

*Primary Examiner* — Richemond Dorvil
*Assistant Examiner* — Ethan Daniel Kim
(74) *Attorney, Agent, or Firm* — IPUSA, PLLC

(57) ABSTRACT

A method and an apparatus are provided for training a named entity recognition (NER) model. By constructing tag annotations for tags and causing the tag annotations to contain information for indicating the positions of tokens in named entities, corresponding to the tags, respectively, in the process of training the NER model, the NER model can better understand the different positions of different tokens in the same named entity, so that the trained NER model can more accurately recognize named entities.

15 Claims, 3 Drawing Sheets

METHOD AND APPARATUS FOR TRAINING NAMED ENTITY RECOGNITION MODEL AND NON-TRANSITORY COMPUTER-READABLE MEDIUM

CROSS-REFERENCE TO RELATED APPLICATIONS

The present application is based on and claims the benefit of priority of Chinese Patent Application No. 202310362781.8 filed on Apr. 6, 2023, the entire contents of which are hereby incorporated by reference.

BACKGROUND OF THE DISCLOSURE

1. Field of the Disclosure

The present disclosure relates to the technical field of machine learning and natural language processing (NLP), and specifically, a method and apparatus for training a named entity recognition (NER) model as well as a non-transitory computer-readable medium.

2. Description of the Related Art

Named entity recognition (also known as entity recognition, entity segmentation, or entity extraction) is a basic task in NLP, and is an important foundational tool for numerous NLP tasks such as information extraction, question answering systems, syntax analysis, machine translation, and the like. The named entity recognition aims to locate named entities in a text and classify them into predetermined entity types, for example, people's names, organization names, place names, time expressions, quantities, currency value, and percentages.

Currently, a named entity recognition method based on sequence tagging (also called sequence labeling) utilizes a pre-trained language model (such as a BERT (Bidirectional Encoder Representations from Transformers) model) as an underlying text feature encoder to obtain an encoded representation of a token sequence of a text, utilizes a fully-connected layer to classify each token in the token sequence of the text, and utilizes Softmax or CRF (Conditional Random Fields) to conduct a final tag (also called a label) determination.

For a conventional named entity recognition task, a named entity recognition model (also called an NER model for short) usually does not know what tags it outputs exactly are and what the meaning of each of the tags is. The NER model just outputs a training text as numbers, which are preset for respective tags. In order to improve the recognition performance of an NER model on named entities, a LEAR (Label knowledge Enhanced Representation) model introduces tag annotation information to describe tags. For example, regarding a tag "Person's Name" (also called a "Name" for short), its tag annotation information may be a title of a person or a word or a set of words by which a person is known, addressed, or referred to. By taking advantage of attention mechanism, each word in a training text obtains the meaning of each tag, and then, the LEAR model decides which tag to output. Compared with the conventional NER models (such as BERT-MRC (Machine Reading Comprehension) models, etc.), the recognition performance of the LEAR model can be improved to a certain extent.

However, what is described in the LEAR model is the tags themselves. For a named entity recognition task based on sequence tagging, if a BIO (B-begin, I-inside, O-outside) tag is taken as an example, then although a tag starting with "B-" and a tag starting with "I-" belong to the same category, the algorithm in the LEAR model cannot well distinguish them because their meanings are different. For example, regarding "B-Name" ("B-Person's Name") and "I-Name" ("I-Person's Name"), there is only one processing manner for "Name" in the LEAR model. It is obvious that there exists a positional difference between the two, namely "B-Name" represents the first word of "Name", and "I-Name" represents the subsequent word of "Name". Therefore, it is necessary to further ameliorate the algorithm so as to improve the recognition performance of the NER model.

SUMMARY OF THE DISCLOSURE

The present disclosure aims to provide a method and apparatus for training a named entity recognition (NER) model, by which it is possible to improve the recognition performance of the trained NER model.

In order to solve the technical problem, the present disclosure is implemented as follows.

According to a first aspect of the present disclosure, a method of training a named entity recognition model is provided. The named entity recognition model includes an encoder and a decoder. The encoder contains a pre-trained language model and an attention mechanism model. The method is inclusive of steps of acquiring a plurality of training texts, wherein, each training text is pre-marked with tags, and the tags are used to mark named entity types to which tokens in the training text belong, and constructing a tag annotation for each of the tags, wherein, in response to each of the tags being a tag corresponding to a named entity, the tag annotation includes a position indication token that is used to indicate a position of the token in the named entity, corresponding to the tag; generating a weight matrix on the basis of all the tag annotations, wherein, each row of the weight matrix corresponds to one tag annotation, respective elements in the row sequentially correspond to the tokens in the tag annotation, values of the elements corresponding to the position indication tokens in the tag annotation are k, values of the elements corresponding to the tokens other than the position indication tokens in the tag annotation are 0 (zero), and k is a learnable parameter during a process of training the named entity recognition model; inputting the training text and the tag annotations into the pre-trained language model to obtain a first vector representation of the training text and a first vector representation of the tag annotations; inputting the first vector representation of the training text and the first vector representation of the tag annotations into the attention mechanism model to calculate a first relationship between the training text and the tag annotations, weighting the first relationship by using the weight matrix to obtain a second relationship, and generating a final vector representation of the training text on the basis of the second relationship; inputting the final vector representation of the training text into the decoder to obtain a tag corresponding to each token in the training text, output by the decoder; and optimizing the named entity recognition model on the basis of the tag corresponding to each token in the training text, output by the decoder and the pre-marked tags in the training text to obtain a trained named entity recognition model.

As an option, the generation of the weight matrix includes unifying numbers of the tokens of all the tag annotations on the basis of a maximum number of tokens in all the tag annotations; initializing a zero matrix, wherein, each row of the zero matrix corresponds to one tag annotation, and respective elements in each row sequentially correspond to the tokens in the tag annotation; and setting values of the elements in the zero matrix, corresponding to the position indication tokens in all the tag annotations to k, so as to obtain the weight matrix, wherein, an initial value of k is 1 (one).

As an option, the obtainment of the first vector representation of the training text and the first vector representation of the tag annotations includes inputting the training text and the tag annotations into the pre-trained language model to obtain identifications (IDs) of the training text and IDs of the tag annotations both represented by numerical values; and generating the first vector representation of the training text on the basis of the IDs of the training text, and generating the first vector representation of the tag annotations on the basis of the IDs of the tag annotations.

As an option, the calculation of the first relationship between the training text and the tag annotations includes weighting the first vector representation of the training text by using a first weight parameter to obtain a second vector presentation of the training text, and weighting the first vector representation of the tag annotations by using a second weight parameter to obtain a second vector representation of the tag annotations, wherein, the first weight parameter and the second weight parameter are learnable parameters; and calculating the first relationship between the training text and the tag annotations on the basis of the second vector representation of the training text and the second vector representation of the tag annotations.

As an option, the obtainment of the second relationship by using the weight matrix to weight the first relationship includes dimensionally expanding the weight matrix so that dimensions of the expanded weight matrix are the same as dimensions of the first relationship, and adding the expanded weight matrix and the first relationship to obtain the second relationship.

As an option, the generation of the final vector representation of the training text on the basis of the second relationship includes calculating a third vector representation of the training text on the basis of the second relationship and the second vector representation of all the tag annotations, wherein, the third vector representation of the training text is represented as a token level vector representation; converting the third vector representation of the training text into a sentence level vector representation to obtain a fourth vector representation of the training text; and combining the fourth vector representation of the training text and the second vector representation of the training text to obtain the final vector representation of the training text.

As an option, the tags are BIO tags, BMES tags, or BIOSE tags.

As an option, the method further includes a step of performing named entity recognition by utilizing the trained named entity recognition model.

According to a second aspect of the present disclosure, an apparatus for training a named entity recognition model is provided. The named entity recognition model includes an encoder and a decoder. The encoder contains a pre-trained language model and an attention mechanism model. The apparatus is inclusive of a first acquisition part configured to acquire a plurality of training texts, wherein, each training text is pre-marked with tags, and the tags are used to mark named entity types to which tokens in the training text belong, and construct a tag annotation for each of the tags, wherein, in response to each of the tags being a tag corresponding to a named entity, the tag annotation includes a position indication token that is used to indicate a position of the token in the named entity, corresponding to the tag; a first generation part configured to generate a weight matrix on the basis of all the tag annotations, wherein, each row of the weight matrix corresponds to one tag annotation, respective elements in the row sequentially correspond to the tokens in the tag annotation, values of the elements corresponding to the position indication tokens in the tag annotation are k, values of the elements corresponding to the tokens other than the position indication tokens in the tag annotation are 0 (zero), and k is a learnable parameter during a process of training the named entity recognition model; a first obtainment part configured to input the training text and the tag annotations into the pre-trained language model to obtain a first vector representation of the training text and a first vector representation of the tag annotations; a second obtainment part configured to input the first vector representation of the training text and the first vector representation of the tag annotations into the attention mechanism model to calculate a first relationship between the training text and the tag annotations, weight the first relationship by using the weight matrix to obtain a second relationship, and generate a final vector representation of the training text on the basis of the second relationship; a third obtainment part configured to input the final vector representation of the training text into the decoder to obtain a tag corresponding to each token in the training text, output by the decoder; and an optimization part configured to optimize the named entity recognition model on the basis of the tag corresponding to each token in the training text, output by the decoder and the pre-marked tags in the training text to obtain a trained named entity recognition model.

As an option, the first generation part is further configured to unify numbers of the tokens of all the tag annotations on the basis of a maximum number of tokens in all the tag annotations; initialize a zero matrix, wherein, each row of the zero matrix corresponds to one tag annotation, and respective elements in each row sequentially correspond to the tokens in the tag annotation; and set values of the elements in the zero matrix, corresponding to the position indication tokens in all the tag annotations to k, so as to obtain the weight matrix, wherein, an initial value of k is 1 (one).

As an option, the first obtainment part is further configured to input the training text and the tag annotations into the pre-trained language model to obtain identifications (IDs) of the training text and IDs of the tag annotations both represented by numerical values; and generate the first vector representation of the training text on the basis of the IDs of the training text, and generate the first vector representation of the tag annotations on the basis of the IDs of the tag annotations.

As an option, the second obtainment part is further configured to weight the first vector representation of the training text by using a first weight parameter to obtain a second vector presentation of the training text, and weight the first vector representation of the tag annotations by using a second weight parameter to obtain a second vector representation of the tag annotations, wherein, the first weight parameter and the second weight parameter are learnable parameters; and calculate the first relationship between the training text and the tag annotations on the basis of the second vector representation of the training text and the second vector representation of the tag annotations.

As an option, the second obtainment part is further configured to dimensionally expand the weight matrix so that dimensions of the expanded weight matrix are the same as dimensions of the first relationship, and add the expanded weight matrix and the first relationship to obtain the second relationship.

As an option, the second obtainment part is further configured to calculate a third vector representation of the training text on the basis of the second relationship and the second vector representation of all the tag annotations, wherein, the third vector representation of the training text is represented as a token level vector representation; convert the third vector representation of the training text into a sentence level vector representation to obtain a fourth vector representation of the training text; and combine the fourth vector representation of the training text and the second vector representation of the training text to obtain the final vector representation of the training text.

As an option, the apparatus further includes a named entity recognition part configured to perform named entity recognition by utilizing the trained named entity recognition model.

According to a third aspect of the present disclosure, a non-transitory computer-readable medium is provided that stores a computer program containing computer-executable instructions for execution by a computer having a processor. The computer program causes, when executed by the processor, the processor to conduct the method according to the first aspect of the present disclosure.

Compared with the prior art, the method or apparatus for training an NER model in accordance with the embodiments of the present disclosure introduces, in the process of training the NER model, the positional information of the tokens corresponding to the tags, in the named entities. In this way, the NER model can better understand the different positions of different tokens in the same named entity, so that the trained NER model can more accurately recognize named entities. That is, it is possible to improve the recognition performance of the trained NER model.

DETAILED DESCRIPTION OF THE PREFERRED EMBODIMENTS

In order to let a person skilled in the art better understand the present disclosure, hereinafter, the embodiments of the present disclosure are concretely described with reference to the drawings. However, it should be noted that the same symbols, that are in the specification and the drawings, stand for constituent elements having basically the same function and structure, and the repetition of the explanations to the constituent elements is omitted.

Figure 1:
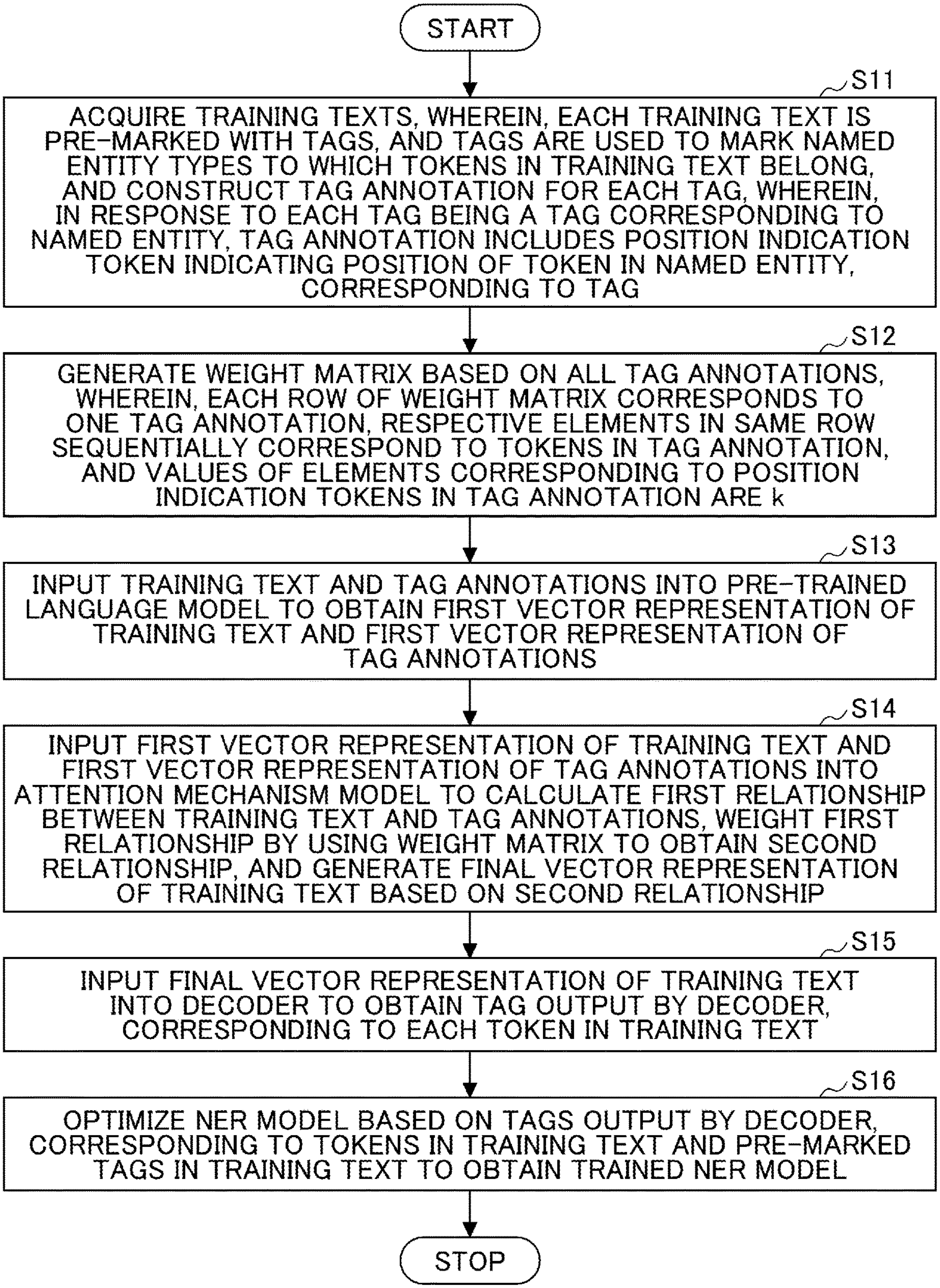
FIG. 1 is a flowchart of a method of training an NER model in accordance with an embodiment of the present disclosure.

FIG. 1 is a flowchart of a method of training an NER model in accordance with an embodiment of the present disclosure. The NER model contains an encoder and a decoder. The encoder includes a pre-trained language model and an attention mechanism model. As shown in FIG. 1, the method is inclusive of STEPS S11 to S16.

STEP S11 in FIG. 1 is acquiring a plurality of training texts, wherein, each training text is pre-marked with tags, and the tags are used to mark the named entity types to which the tokens in the training text belong, and constructing a tag annotation for each of the tags, wherein, in response to each of the tags being a tag corresponding to a named entity, the tag annotation includes a position (location) indication token that is used to indicate the position of the token corresponding to the tag, in the named entity.

In this embodiment, the token refers to the granularity when the pre-trained language model processes a text. Specifically, it may be a single Chinese character in Chinese, a word or a sub-word in English, etc. The pre-trained language model includes but is not limited to any one of a BERT model, a ROBERTa (Robustly Optimized BERT Pretraining Approach) model, an ALBERT (A Lite BERT for Self-supervised Learning of Language Representations) model, and so on. In what follows, the BERT model is taken as an example for illustration.

Here, a training set is obtained. The training set contains a plurality of training texts, and each training text is pre-marked with tags. Specifically, the tokens in the training text are pre-marked with corresponding tags. These tags may be marked on the basis of the named entity types to which the tokens belong as well as the positional relationship between the tokens and the named entity types. That is, different types of tags can reflect the named entity types to which the tokens belong as well as the positional relationship between the tokens and the named entity types. Particularly, it is possible to adopt a tagging system such as BIO, BIOSE (B-begin, I-inside, O-outside, S-single, E-end), or BMES (B-begin, M-middle, E-end, S-single) well used in named entity recognition. That is, the tags may be the BIO tags, the BIOSE tags, or the BMES tags. Hereinafter, the BIO tags are taken as an example for illustration; however, the method is also applicable to the BIOSE tags and the BMES tags.

Taking the BIO tags as an example, for a named entity "name" ("person's name"), there are two types of tags, namely B-Name and I-Name. The tag B-Name indicates that the named entity to which a token belongs is "name", and the token is the starting token of the named entity it belongs to. The tag I-Name indicates that the named entity to which a token belongs is "name", and the token is the subsequent token of the named entity it belongs to. Regarding the tag O, it means that its corresponding token does not belong to any named entity, i.e., the token is a non-named entity. Here, a non-named entity may also serve as a special named entity type.

To introduce the semantic information of tags, in this embodiment, each of the tags is annotated according to its meaning, and a corresponding tag annotation is constructed for the same tag. A tag annotation is a text description that usually includes a plurality of tokens. When the tag is a tag corresponding to a named entity, the corresponding tag annotation contains a position indication token used to indicate the position of the token corresponding to the tag, in the named entity. When the tag is a tag corresponding to a non-named entity, the corresponding tag annotation may not contain a position indication token. In this way, a dictionary can be obtained on the basis of the constructed tag annotations, that includes the tag annotations of all the tags.

Table 1 shows an example of a training text pre-marked with tags. In Table 1, the training text is "Xiao Ming lives in Beijing". The tag corresponding to the token "Xiao" is "B-Name" representing that the token "Xiao" is the starting token of the person's name entity "Xiao Ming". The tag corresponding to the token "Ming" is "I-Name" representing that the token "Ming" is the subsequent token of the person's name entity "Xiao Ming". The tags corresponding to the other tokens in the training text are "O"; that is, these tokens are non-named entities.

TABLE 1

| TRAINIG TEXT | Xiao | Ming | lives | in | Beijing |
|---|---|---|---|---|---|
| TAGS | B-Name | I-Name | O | O | B-location |

Table 2 illustrates examples of tag annotations. In Table 2, a related (existing) tag annotation explains the meanings of a tag corresponding to a named entity. On the other hand, in this embodiment, position indication tokens are further added on the basis of the BIO tag annotations. For example, the added position indication token "The begin character of . . . " in Table 2 is used to indicate that this token is the starting token in the named entity, and the added position indication token "The inside character of . . . " in Table 2 is used to indicate that this token is the subsequent token in the named entity, thereby being able to indicate the positions of the tokens corresponding to the tags, in the named entity. To highlight, underlines have been added to the position indication tokens in Table 2. In addition, for the "O" tag(s), it is possible to generate a tag annotation(s) of a blank character(s).

TABLE 2

| RELATED TAG ANNOTATION | Name | A term used for others to call |
|---|---|---|
| BIO TAG ANNOTATIONS | B-Name | The begin character of a term used for others to call |
| | I-Name | The inside character of a term used for others to call |

STEP S12 of FIG. 1 is generating a weight matrix on the grounds of all the tag annotations. Each row of the weight matrix corresponds to one tag annotation, and the respective elements in the same row sequentially correspond to the tokens in the tag annotation. The values of the elements in the weight matrix, corresponding to the position indication tokens in the tag annotations are k, and the values of the elements in the weight matrix, corresponding to the tokens other than the position indication tokens in the tag annotations are 0 (zero). Here, k is a learnable parameter in the process of training the NER model.

First, it is possible to unify the numbers of tokens of all the tag annotations on the basis of the maximum number of tokens in all the tag annotations. Assuming that the maximum number of tokens in all the tag annotation is m, regarding the tag annotation(s) whose number of tokens is less than m, it is possible to insert blank characters (such as [PAD]) to let the number of tokens contained in the tag annotation(s) reach m. Second, a zero (null) matrix is initialized. For example, an n*m zero matrix is initialized. Each row in the n*m zero matrix corresponds to one tag annotation, and the respective elements of the same row sequentially correspond to the tokens in the tag annotation. Here, n is the number of tag annotation. Finally, the values of the elements in the n*m zero matrix, corresponding to the position indication tokens in the tag annotations are set to k, so as to obtain the weight matrix. Here, the initial value of k is 1.

Tables 3 and 4 present a way of building a weight matrix. An n*m zero matrix is initialized first. Here, n denotes the number of tags (tag annotations), and m denotes the maximum length of the tag annotations. In Table 3, it is assumed that n is equal to 3 (n=3), and m is equal to 11 (m=11), i.e., there are 3 tag annotations in total, and the maximum length of all the tag annotations is 11. Next, for each of the 3 tag annotations, the values of the elements in the zero matrix, corresponding to the position dedication tokens in the same tag annotation are changed from 0 to k based on the corresponding positions, so as to obtain a weight matrix Wp as shown in Table 4. Here, it should be noted that in Table 3, only the values of the elements in the zero matrix, corresponding to a part of the position indication tokens, i.e., "begin" and "inside" are set to k. Of course, the values of the elements in the zero matrix, corresponding to all the position indication tokens may also be set to k.

TABLE 3

| | | | | | | | | | | |
|---|---|---|---|---|---|---|---|---|---|---|
| The | begin | character | of | a | term | used | for | others | to | call |
| 0 | k | 0 | 0 | 0 | 0 | 0 | 0 | 0 | 0 | 0 |
| The | inside | character | of | a | term | used | for | others | to | call |
| 0 | k | 0 | 0 | 0 | 0 | 0 | 0 | 0 | 0 | 0 |
| Other | | | | | | | | | | |
| 0 | 0 | 0 | 0 | 0 | 0 | 0 | 0 | 0 | 0 | 0 |

TABLE 4

| | | | | | | | | | | |
|---|---|---|---|---|---|---|---|---|---|---|
| 0 | K | 0 | 0 | 0 | 0 | 0 | 0 | 0 | 0 | 0 |
| 0 | K | 0 | 0 | 0 | 0 | 0 | 0 | 0 | 0 | 0 |
| 0 | 0 | 0 | 0 | 0 | 0 | 0 | 0 | 0 | 0 | 0 |

STEP S13 in FIG. 1 is inputting the training text and the tag annotations into the pre-trained language model to obtain a first vector representation of the training text and a first vector representation of the tag annotations.

Here, the training text and the tag annotations are input into the pre-trained language model so that the identifications (IDs) of the training text and the IDs of the tag annotations both represented by numerical values are obtained. Subsequently, the first vector representation of the training text is generated based on the IDs of the training text, and the first vector representation of the tag annotations is generated based on the IDs of the tag annotations.

For example, it is possible to utilize the tokenizer of a BERT model (a pre-train model) to respectively convert the training text and the tag annotations into ID formats representing tokens with numbers in the BERT model, so as to obtain the IDs (represented by $ID_{text}$) of the training text and the IDs (represented by $ID_{label\ annotation}$) of the tag annotations. Here, the $ID_{text}$ of the training text and the $ID_{label\ annotation}$ of the tag annotations are composed of the IDs of the tokens they contain, respectively. It is supposed that the IDs of a training text are represented by $ID_{text}$=($ID_{token1}$, $ID_{token2}$, . . . , $ID_{tokenn}$), i.e., composed of the IDs of n tokens. Here, each $ID_{token}$ stands for the ID (BERT ID) of a token in the training text. Similarly, if it is supposed that a tag annotation contains m tokens, then the IDs of the tag annotation are represented by $ID_{label\ annotation}=(ID_{labeltoken1}, ID_{labeltoken2}, \ldots, ID_{labeltokenm})$. Here, each $ID_{labeltoken}$ stands for the ID (BERT ID) of a token in the tag annotation. It is worth noting that m and n may not be the same because when initially built, the maximum length of the training text is not necessarily the same as the maximum length of the tag annotations. One way of calculating the first vector representation (a hidden layer representation) of a training text and the first vector representation (a hidden layer representation) of a tag annotation may be expressed as follows.

$$h_{text}=\mathrm{BERT}(ID_{token})$$

$$h_{label\ annotation}=\mathrm{BERT}(ID_{labeltoken})$$

Here, $h_{text}$ denotes the vector representation (the hidden layer representation) of a token in the training text; $h_{label\ annotation}$ denotes the vector representation (the hidden layer representation) of a token in the tag annotation; BERT is the pre-trained language model used to convert numbers into the vector representation (the hidden layer representation); and $ID_{token}$ and $ID_{labeltoken}$ are the ID of a token in the $ID_{text}$ and the $ID_{label\ annotation}$, respectively.

After calculating all the $h_{text}$ and all the $h_{label\ annotation}$, it is possible to obtain the first vector representation (the hidden layer representation) of the training text i.e., $H_{text}=(h_{text1}, h_{text2}, \ldots, h_{textn})$ and the first vector representation (the hidden layer representation) of the tag annotations i.e., $H_{lable\ annotation}=(h_{label\ annotation1}, h_{label\ annotation2}, \ldots, h_{label\ annotationm})$. Here, each h is a vector with d dimensions (the hidden lay dimension of the pre-trained language model). Then, the first hidden layer representation of all the tag annotations can be obtained, i.e., $H_{labels}=(H_{label1\ annotation}/H_{label2\ annotation}, \ldots, H_{labelm\ annotation})$. Here, the dimensions of $H_{text}$ are (the maximum number of tokens in all the training texts, the hidden layer dimension), and the dimensions of $H_{labels}$ are (the number of tags, the maximum number of tokens in all the tag annotations, the hidden layer dimension).

STEP S14 of FIG. 1 is inputting the first vector representation of the training text and the first vector representation of the tag annotations into the attention mechanism model to calculate the first relationship between the training text and the tag annotations, utilizing the weight matrix to weight the first relationship so as to obtain a second relationship, and generating a final vector representation of the training text on the basis of the second relationship.

Here, attention mechanism is utilized to calculate the first relationship between the first vector representation of the training text and the first vector representation of the tag annotations. Specifically, it is possible to utilize a first weight parameter $w_1$ to weight the first vector representation $H_{text}$ of the training text so as to obtain a second vector representation Q of the training text, and utilizes a second weight parameter $w_2$ to weight the first vector representation $H_{labels}$ of the tag annotations so as to obtain a second vector representation K of the tag annotations. The first weight parameter $w_1$ and the second weight parameter $w_2$ are model parameters in the attention mechanism model, and are learnable parameters, i.e., can be updated in the process of training the NER model. Next, the first relationship between the training text and the tag annotations is calculated on the basis of the second vector representation Q of the training text and the second vector representation K of the tag annotations. One way of calculation this process may be expressed by the following equations.

$$Q=w_1H_{text}$$

$$K=w_2H_{labels}$$

$$QK=\mathrm{softmax}(Q*K^T)$$

Here, QK is used to represent the relationship (the first relationship) between the training text and the tag annotations; softmax is a kind of algorithm that is used for compressing numerical values to a range of 0 to 1; and the superscript T represents a transposed matrix that is used to calculate the matrix multiplication of Q and K.

In this embodiment, the weight matrix Wp is also utilized to weight the first relationship QK, so as to obtain a second relationship. Specifically, it is possible to dimensionally expand the weight matrix Wp so that the dimensions of the expanded weight matrix are the same as the dimensions of the first relationship QK, and add the expanded weight matrix and the first relationship QK to obtain the second relationship, thereby being able to introduce the information of the position indication tokens in the tag annotations into the NER model. One way of calculation this process may be represented by the following equation.

$$\mathrm{relation}=Wp*\mathrm{sentence\_max\_length}\oplus QK$$

Here, relation is used to represent the second relationship; the dimensions of Wp are (the numbers of tags, the maximum number of tokens in all the tag annotations); Wp*sentence_max_length means that the dimensions of Wp are expanded to (the maximum number of tokens in all the training texts, the number of tags, the maximum number of tokens in all the tag annotations); and ⊕ represents the addition of the corresponding elements in the two matrices. Hence, the dimensions of relation become (the maximum number of tokens in all the training texts, the number of tags, the maximum number of tokens in all the tag annotations).

Subsequently, the final vector representation of the training text is generated on the basis of the second relationship relation. Specifically, it is possible to calculate a third vector representation R of the training text on the basis of the second relationship relation and the second vector representation K of the tag annotations. Here, the third vector representation R of the training text is a token level vector representation. Then, the third vector representation R of the training text is converted into a sentence level vector representation to obtain a fourth vector representation R* of the training text. Next, the fourth vector representation R* of the training text and the second vector representation Q of the training text are combined to obtain the final vector representation $H_{final}$ of the training text. One way of calculating this process may be expressed as follows.

$$R=K*\mathrm{sentence\_max\_length}\odot\mathrm{relation}$$

Here, R is used to represent the token level vector representation of the training text after combining the vector representations of all the tag annotations; K*sentence_max_length means that the dimensions of K is expanded to (the maximum number of tokens in all the training texts, the number of tags, the maximum number of tokens in all the tag annotations, the hidden layer dimension); and ⊙ represents the multiplication of the corresponding elements in the two matrices. Hence, the dimensions of R become (the maximum number of tokens in all the training texts, the number of tags, the maximum number of tokens in all the tag annotations, the hidden layer dimension).

The fourth vector representation R* of the training text is the sentence level vector representation of the training text after combining the vector representations of all the tag annotations. One way of calculating the fourth vector representation R* of the training text may be expressed by the following equation.

$$R^*=\Sigma_{t=1}R[:,:,t,:]$$

In this embodiment, R has four dimensions. In the above equation, "," is used to separate the four dimensions, and three ":" and one "t" correspond the four dimensions of R, respectively. Here, ":" represents all the elements of R in one dimension, and "t" represents the t-th element in the corresponding dimension. The above equation represents adding the respective token level vector representations in R, i.e., adding all the elements of R in the third dimension (the dimension of "the maximum number of tokens in all the tag annotations"), thereby converting the token level vector representation R into the sentence level vector representation R* whose dimensions are (the maximum number of tokens in all the training texts, the number of tags, the hidden layer dimension).

Eventually, the final vector representation $H_{final}$ of the training text is obtained by adding R* and Q. Here, it should be noted that before performing the addition, it is necessary to expand the dimensions of Q to (the maximum number of tokens in all the training texts, the number of tags, the hidden layer dimension). One way of calculating the final vector representation $H_{final}$ may be expressed as follows.

$$H_{final}=R^*\oplus Q^*\text{num\_labels}$$

Here, Q*num_labels means that the dimensions of Q are expanded to (the maximum number of tokens in all the training texts, the number of tags, the hidden layer dimension), and ⊕ represents the addition of the corresponding elements in the two matrices.

STEP S15 in FIG. 1 is inputting the final vector representation of the training text into the decoder to obtain a tag corresponding to each token in the training text, output by the decoder.

Here, the final vector representation of the training text is input into the decoder so that the tags corresponding to the tokens, output from the decoder are obtained. This may be expressed as follow.

$$\text{output}=\text{argmax}(w_3H_{final})$$

Here, argmax is a type of algorithm for acquiring an index with a maximum value, and is used to obtain the result predicted by the relevant model, and $w_3$ is a learnable parameter.

STEP S16 of FIG. 1 is optimizing the NER model on the basis of the tag corresponding to each token in the training text, output by the decoder and the pre-marked tags in the training text, so as to obtain a trained NER model.

Here, in this embodiment, it is possible to calculate the differences between the tags output from the decoder and the corresponding pre-marked tags in the training text and performing iterative optimization on the model parameters of the NER model on the basis of the differences, so as to obtain the trained NER model.

When the conventional NER models conduct named entity recognition, they usually only classify the output results into a certain category, and cannot well understand the specific meaning of this category. However, in the method according to this embodiment, tag annotations corresponding to tags in a training text are first constructed, so that a NER model can obtain the meaning of each of the tags. Furthermore, on the basis of the tag annotations and the sequence tagging, weight attention mechanism is introduced to make the difference between the tags belonging to the same category but representing different positions more obvious, and the degree of this kind of obviousness is learnable, so that it is impossible to cause the balance to tilt too much. That is, on the grounds of the original tag attention mechanism, the positional information of the tokens in the named entities, corresponding to the tags is introduced. For example, regarding tags "B-Name" and "I-Name", although they both belong to the same named entity "Person's Name", the positions of their corresponding tokens in the named entity are different. During the process of training the NER model in this embodiment, by introducing the positional information, it is possible to cause the NER model to better understand the different positions of the tokens in the named entity. In this way, the trained NER model can more accurately recognize named entities; that is, the recognition performance of the trained NER model can be improved.

After training the NER model, it is also possible to utilize the trained NER model to conduct named entity recognition.

On the basis of the method as described above, an apparatus for implementing the method is further provided in an embodiment of the present disclosure.

Figure 2:
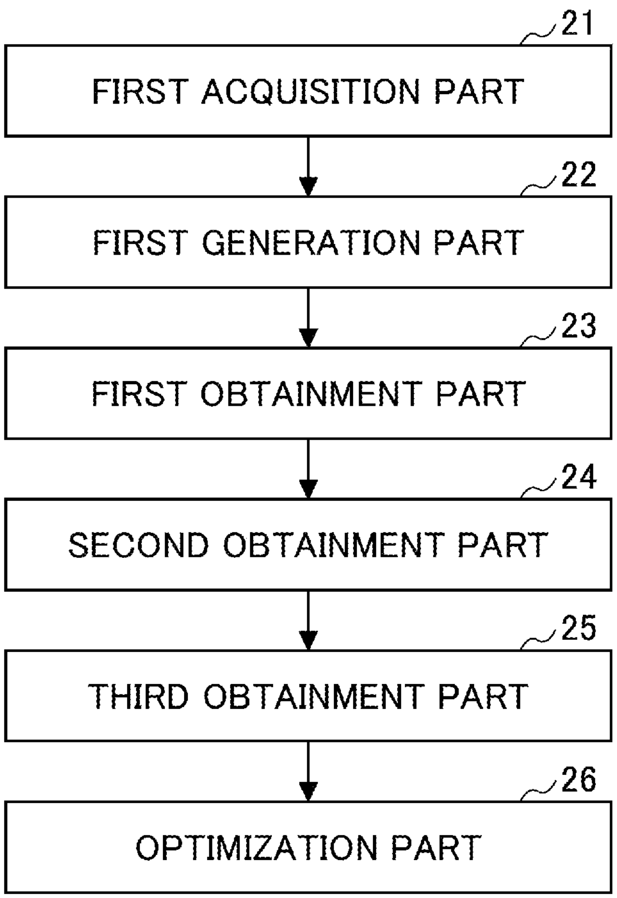
FIG. 2 illustrates a structure of an apparatus for training an NER model in accordance with an embodiment of the present disclosure.

FIG. 2 illustrates a structure of an apparatus for training an NER model in accordance with this embodiment. The NER model is inclusive of an encoder and a decoder. The encoder contains a pre-trained language model and an attention mechanism model. As shown in FIG. 2, the apparatus includes a first acquisition part 21, a first generation part 22, a first obtainment part 23, a second obtainment part 24, a third obtainment part 25, and an optimization part 26.

The first acquisition part 21 is configured to acquire a plurality of training texts, wherein, each training text is pre-marked with tags, and the tags are used to mark the named entity types to which the tokens in the training text belong, and construct a tag annotation for each of the tags, wherein, in response to each of the tags being a tag corresponding to a named entity, the tag annotation includes a position indication token that is used to indicate the position of the token corresponding to the tag, in the named entity.

The first generation part 22 is configured to generate a weight matrix on the basis of all the tag annotations. Each row of the weight matrix corresponds to one tag annotation, and the respective elements in the row sequentially correspond to the tokens in the tag annotation. The values of the elements corresponding to the position indication tokens in the tag annotation are k, and the values of the elements corresponding to the tokens other than the position indication tokens in the tag annotation are 0 (zero). Here, k is a learnable parameter during the process of training the NER model.

The first obtainment part 23 is configured to input the training text and the tag annotations into the pre-trained language model to obtain a first vector representation of the training text and a first vector representation of the tag annotations.

The second obtainment part 24 is configured to input the first vector representation of the training text and the first vector representation of the tag annotations into the attention mechanism model to calculate a first relationship between the training text and the tag annotations, weight the first relationship by using the weight matrix to obtain a second relationship, and generate a final vector representation of the training text on the basis of the second relationship.

The third obtainment part 25 is configured to input the final vector representation of the training text into the decoder to obtain a tag corresponding to each token in the training text, output by the decoder.

The optimization part 26 is configured to optimize the NER model on the basis of the tag corresponding to each token in the training text, output by the decoder and the pre-marked tags in the training text to obtain a trained NER model.

In this embodiment, by making use of the parts of the apparatus, during the process of training an NER model, the positional information of tokens in named entities, corresponding to tags in a training text is introduced, so that the NER model can better understand the different positions of the tokens in the named entities. As such, the trained NER model can more accurately recognize named entities; namely the recognition performance of the trained NER model can be improved.

As an option, the first generation part 22 is further configured to unify the numbers of the tokens of all the tag annotations on the basis of the maximum number of the tokens in all the tag annotations; initialize a zero matrix, wherein, each row of the zero matrix corresponds to one tag annotation, and the respective elements in each row sequentially correspond to the tokens in the tag annotation; and set values of the elements in the zero matrix, corresponding to the position indication tokens in all the tag annotations to k, so as to obtain the weight matrix, wherein, the initial value of k is 1 (one).

As an option, the first obtainment part 23 is further configured to input the training text and the tag annotations into the pre-trained language model to obtain the identifications (IDs) of the training text and the IDs of the tag annotations both represented by numerical values; and generate the first vector representation of the training text on the basis of the IDs of the training text, and generate the first vector representation of the tag annotations on the basis of the IDs of the tag annotations.

As an option, the second obtainment part 24 is further configured to weight the first vector representation of the training text by using a first weight parameter to obtain a second vector presentation of the training text, and weight the first vector representation of the tag annotations by using a second weight parameter to obtain a second vector representation of the tag annotations, wherein, the first weight parameter and the second weight parameter are learnable parameters; and calculate the first relationship between the training text and the tag annotations on the basis of the second vector representation of the training text and the second vector representation of the tag annotations.

As an option, the second obtainment part 24 is further configured to dimensionally expand the weight matrix so that the dimensions of the expanded weight matrix are the same as the dimensions of the first relationship, and add the expanded weight matrix and the first relationship to obtain the second relationship.

As an option, the second obtainment part 24 is further configured to calculate a third vector representation of the training text on the basis of the second relationship and the second vector representation of all the tag annotations, wherein, the third vector representation of the training text is represented as a token level vector representation; convert the third vector representation of the training text into a sentence level vector representation to obtain a fourth vector representation of the training text; and combine the fourth vector representation of the training text and the second vector representation of the training text to obtain the final vector representation of the training text.

As an option, the apparatus further includes a named entity recognition part configured to perform named entity recognition by utilizing the trained NER model.

Here it should be pointed out that the apparatus according to this embodiment corresponding to the method according to the above embodiment. For example, the parts in the apparatus can be configured to conduct STEPS S11 to S16 of FIG. 1. Because STEPS S11 to S16 in FIG. 1 have been concretely described in the above embodiment, the details of them are omitted in this embodiment for the sake of convenience.

Figure 3:
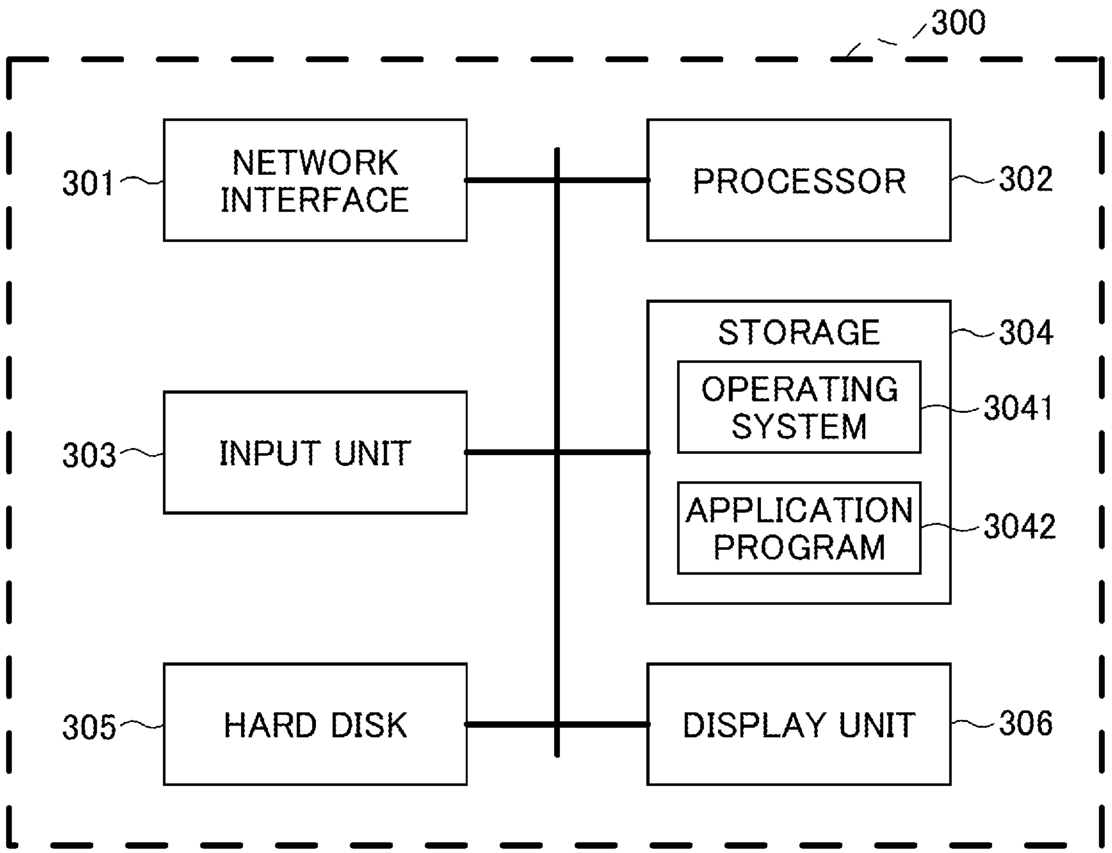
FIG. 3 shows a structure of another apparatus for training an NER model in accordance with an embodiment of the present disclosure.

In what follows, another apparatus for executing the method as set forth above is further provided in an embodiment of the present disclosure. FIG. 3 shows the structure of another apparatus 300 for training an NER model in accordance with this embodiment.

As shown in FIG. 3, the other apparatus 300 is inclusive of a processor 302 and a storage 304 in which an operating system 3041 and an application program 3042 is stored.

When the application program 3042 is executed by the processor 302, the application program 3042 may cause the processor 302 to carry out the method according to the above embodiment.

In addition, as presented as FIG. 3, the other apparatus 300 further contains a network interface 301, an input unit 303, a hard disk 305, and a display unit 306.

The network interface 301 may be configured to connect to a network such as the Internet, a local area network (LAN), or the like. The input unit 303 may be configured to let a user input various instructions that may be a keyboard or a touch panel, for example. The hard disk 305 may be configured to store any information or data necessary to achieve the method in accordance with the above embodiment. The display unit 306 may be configured to display the result acquired when executing the application program 3042 by the processor 302.

Furthermore, a computer-executable program and a non-transitory computer-readable medium are further provided. The computer-executable program may cause a computer to perform the method according to the above embodiment. The non-transitory computer-readable medium may store computer-executable instructions (the computer-executable program) for execution by a computer involving a processor. The computer-executable instructions may cause, when executed by the processor, the processor to execute the method according to the above embodiment.

Here is should be noted that the embodiments are just exemplary ones, and the specific structure and operation of them may not be used for limiting the present disclosure.

In addition, the embodiments of the present disclosure may be implemented in any convenient form, for example, using dedicated hardware or a mixture of dedicated hardware and software. The embodiments of the present disclosure may be implemented as computer software executed by one or more networked processing apparatuses. The network may include any conventional terrestrial or wireless communications network, such as the Internet. The processing apparatuses may include any suitably programmed apparatuses such as a general-purpose computer, a personal digital assistant, a mobile telephone (such as a WAP or 3G, 4G, or 5G-compliant phone) and so on. Since the embodiments of the present disclosure may be implemented as software, each and every aspect of the present disclosure thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform may include any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present disclosure is described with reference to the specific embodiments chosen for purpose of illustration, it should be apparent that the present disclosure is not limited to these embodiments, but numerous modifications could be made thereto by a person skilled in the art without departing from the basic concept and technical scope of the present disclosure.

What is claimed is:

1. A method of training a named entity recognition model, wherein, the named entity recognition model includes an encoder and a decoder, and the encoder contains a pre-trained language model and an attention mechanism model, the method comprising:

acquiring a plurality of training texts, wherein, each training text is pre-marked with tags, and the tags are used to mark named entity types to which tokens in the training text belong, and constructing a tag annotation for each of the tags, wherein, in response to each of the tags being a tag corresponding to a named entity, the tag annotation includes a position indication token indicating a position of the token in the named entity, corresponding to the tag;

generating a weight matrix on the basis of all the tag annotations, wherein, each row of the weight matrix corresponds to one tag annotation, respective elements in the row sequentially correspond to the tokens in the tag annotation, values of the elements corresponding to the position indication tokens in the tag annotation are k, values of the elements corresponding to the tokens other than the position indication tokens in the tag annotation are 0, and k is a learnable parameter during a process of training the named entity recognition model, wherein the generation of the weight matrix includes:

unifying numbers of the tokens of all the tag annotations on the basis of a maximum number of tokens in all the tag annotations;

initializing a zero matrix, wherein, each row of the zero matrix corresponds to one tag annotation, and respective elements in each row sequentially correspond to the tokens in the tag annotation; and setting values of the elements in the zero matrix, corresponding to the position indication tokens in all the tag annotations to k, so as to obtain the weight matrix, wherein, an initial value of k is 1;

inputting the training text and the tag annotations into the pre-trained language model to obtain a first vector representation of the training text and a first vector representation of the tag annotations;

inputting the first vector representation of the training text and the first vector representation of the tag annotations into the attention mechanism model to calculate a first relationship between the training text and the tag annotations, weighting the first relationship by using the weight matrix to obtain a second relationship, and generating a final vector representation of the training text on the basis of the second relationship;

inputting the final vector representation of the training text into the decoder to obtain a tag corresponding to each token in the training text, output by the decoder; and optimizing the named entity recognition model on the basis of the tag corresponding to each token in the training text, output by the decoder and the pre-marked tags in the training text to obtain a trained named entity recognition model.

2. The method according to claim 1, wherein, the obtainment of the first vector representation of the training text and the first vector representation of the tag annotations includes inputting the training text and the tag annotations into the pre-trained language model to obtain IDs of the training text and IDs of the tag annotations both represented by numerical values; and generating the first vector representation of the training text on the basis of the IDs of the training text, and generating the first vector representation of the tag annotations on the basis of the IDs of the tag annotations.

3. The method according to claim 1, wherein, the calculation of the first relationship between the training text and the tag annotations includes weighting the first vector representation of the training text by using a first weight parameter to obtain a second vector presentation of the training text, and weighting the first vector representation of the tag annotations by using a second weight parameter to obtain a second vector representation of the tag annotations, wherein, the first weight parameter and the second weight parameter are learnable parameters; and calculating the first relationship between the training text and the tag annotations on the basis of the second vector representation of the training text and the second vector representation of the tag annotations.

4. The method according to claim 1, wherein, the obtainment of the second relationship by using the weight matrix to weight the first relationship includes dimensionally expanding the weight matrix so that dimensions of the expanded weight matrix are the same as dimensions of the first relationship, and adding the expanded weight matrix and the first relationship to obtain the second relationship.

5. The method according to claim 1, wherein, the generation of the final vector representation of the training text on the basis of the second relationship includes calculating a third vector representation of the training text on the basis of the second relationship and the second vector representation of all the tag annotations, wherein, the third vector representation of the training text is represented as a token level vector representation;

converting the third vector representation of the training text into a sentence level vector representation to obtain a fourth vector representation of the training text; and combining the fourth vector representation of the training text and the second vector representation of the training text to obtain the final vector representation of the training text.

6. The method according to claim 1, wherein, the tags are BIO tags, BMES tags, or BIOSE tags.

7. The method according to claim 1, further comprising:

performing named entity recognition by utilizing the trained named entity recognition model.

8. A non-transitory computer-readable medium having a computer program for execution by a processor, wherein, the computer program causes, when executed by the processor, the processor to implement the method according to claim 1.

9. An apparatus comprising:

a processor; and a storage storing a computer program, coupled to the processor, wherein, the computer program causes, when executed by the processor, the processor to implement the method according to claim 1.

10. An apparatus for training a named entity recognition model, wherein, the named entity recognition model includes an encoder and a decoder, and the encoder contains a pre-trained language model and an attention mechanism model, the apparatus comprising:

a first acquisition part configured to acquire a plurality of training texts, wherein, each training text is pre-marked with tags, and the tags are used to mark named entity types to which tokens in the training text belong, and construct a tag annotation for each of the tags, wherein, in response to each of the tags being a tag corresponding to a named entity, the tag annotation includes a position indication token indicating a position of the token in the named entity, corresponding to the tag;

a first generation part configured to generate a weight matrix on the basis of all the tag annotations, wherein, each row of the weight matrix corresponds to one tag annotation, respective elements in the row sequentially correspond to the tokens in the tag annotation, values of the elements corresponding to the position indication tokens in the tag annotation are k, values of the elements corresponding to the tokens other than the position indication tokens in the tag annotation are 0, and k is a learnable parameter during a process of training the named entity recognition model, wherein the first generation part is further configured to:

unify numbers of the tokens of all the tag annotations on the basis of a maximum number of tokens in all the tag annotations;

initialize a zero matrix, wherein, each row of the zero matrix corresponds to one tag annotation, and respective elements in each row sequentially correspond to the tokens in the tag annotation; and set values of the elements in the zero matrix, corresponding to the position indication tokens in all the tag annotations to k, so as to obtain the weight matrix, wherein, an initial value of k is 1;

a first obtainment part configured to input the training text and the tag annotations into the pre-trained language model to obtain a first vector representation of the training text and a first vector representation of the tag annotations;

a second obtainment part configured to input the first vector representation of the training text and the first vector representation of the tag annotations into the attention mechanism model to calculate a first relationship between the training text and the tag annotations, weight the first relationship by using the weight matrix to obtain a second relationship, and generate a final vector representation of the training text on the basis of the second relationship;

a third obtainment part configured to input the final vector representation of the training text into the decoder to obtain a tag corresponding to each token in the training text, output by the decoder; and an optimization part configured to optimize the named entity recognition model on the basis of the tag corresponding to each token in the training text, output by the decoder and the pre-marked tags in the training text to obtain a trained named entity recognition model.

11. The apparatus according to claim 10, wherein, the first obtainment part is further configured to input the training text and the tag annotations into the pre-trained language model to obtain IDs of the training text and IDs of the tag annotations both represented by numerical values; and generate the first vector representation of the training text on the basis of the IDs of the training text, and generate the first vector representation of the tag annotations on the basis of the IDs of the tag annotations.

12. The apparatus according to claim 10, wherein, the second obtainment part is further configured to weight the first vector representation of the training text by using a first weight parameter to obtain a second vector presentation of the training text, and weight the first vector representation of the tag annotations by using a second weight parameter to obtain a second vector representation of the tag annotations, wherein, the first weight parameter and the second weight parameter are learnable parameters; and calculate the first relationship between the training text and the tag annotations on the basis of the second vector representation of the training text and the second vector representation of the tag annotations.

13. The apparatus according to claim 10, wherein, the second obtainment part is further configured to dimensionally expand the weight matrix so that dimensions of the expanded weight matrix are the same as dimensions of the first relationship; and add the expanded weight matrix and the first relationship to obtain the second relationship.

14. The apparatus according to claim 10, wherein, the second obtainment part is further configured to calculate a third vector representation of the training text on the basis of the second relationship and the second vector representation of all the tag annotations, wherein, the third vector representation of the training text is represented as a token level vector representation;

convert the third vector representation of the training text into a sentence level vector representation to obtain a fourth vector representation of the training text; and combine the fourth vector representation of the training text and the second vector representation of the training text to obtain the final vector representation of the training text.

15. The apparatus according to claim 10, further comprising:

a named entity recognition part configured to perform named entity recognition by utilizing the trained named entity recognition model.

* * * * *